(12) United States Patent
Lu et al.

(10) Patent No.: US 11,102,809 B2
(45) Date of Patent: Aug. 24, 2021

(54) RELAY SYSTEMS AND METHODS FOR WIRELESS NETWORKS

(71) Applicant: Conversant Intellectual Property Management Inc., Ottawa (CA)

(72) Inventors: Xuejun Lu, Ottawa (CA); Hanwu Hu, Ottawa (CA)

(73) Assignee: Mosaid Technologies Incorporated, Ottawa (CA)

( * ) Notice: Subject to any disclaimer, the term of this patent is extended or adjusted under 35 U.S.C. 154(b) by 0 days.

(21) Appl. No.: 16/751,340

(22) Filed: Jan. 24, 2020

(65) Prior Publication Data

US 2020/0221492 A1 Jul. 9, 2020

Related U.S. Application Data

(60) Continuation of application No. 15/948,130, filed on Apr. 9, 2018, now Pat. No. 10,582,534, which is a division of application No. 14/813,154, filed on Jul. 30, 2015, now Pat. No. 9,986,585.

(60) Provisional application No. 62/031,259, filed on Jul. 31, 2014.

(51) Int. Cl.
*H04W 4/00* (2018.01)
*H04W 74/00* (2009.01)
*H04B 7/155* (2006.01)
*H04W 74/08* (2009.01)

(52) U.S. Cl.
CPC ...... *H04W 74/004* (2013.01); *H04B 7/15507* (2013.01); *H04W 74/0816* (2013.01)

(58) Field of Classification Search
None
See application file for complete search history.

(56) References Cited

U.S. PATENT DOCUMENTS

| | | | | |
|---|---|---|---|---|
| 2006/0281404 A1* | 12/2006 | Lee | ...................... | H04B 7/2606 455/11.1 |
| 2007/0142030 A1* | 6/2007 | Sinha | .................. | H04L 63/1433 455/410 |
| 2007/0274226 A1* | 11/2007 | Tillotson | ................. | H02J 7/025 370/252 |
| 2008/0031197 A1* | 2/2008 | Wang | .................... | H04L 5/0048 370/331 |

(Continued)

*Primary Examiner* — Elisabeth Benoit Magloire
(74) *Attorney, Agent, or Firm* — Conversant IP Management Corp.

(57) ABSTRACT

In one embodiment, a method is performed by a wireless station. The method includes determining that a wireless network provides relay service. The wireless network includes an access point and one or more relay nodes. The method further includes transmitting a relay-service desirability indication to the access point. The method also includes receiving a relay-service confirmation from the access point. The wireless station is operable to transmit at a first station-transmission power level during a first time period and a second station-transmission power level during a second time period. The second station-transmission power level is a reduced station-transmission power level as compared to the first station-transmission power level. In addition, the method includes transmitting an uplink transmission at the second station-transmission power level responsive to the relay-service confirmation from the access point.

20 Claims, 13 Drawing Sheets

(56) References Cited

U.S. PATENT DOCUMENTS

| | | | |
|---|---|---|---|
| 2009/0221288 A1* | 9/2009 | Zhang | H04W 84/047 455/434 |
| 2010/0075663 A1* | 3/2010 | Chang | H04L 1/0026 455/424 |
| 2010/0157826 A1* | 6/2010 | Yu | H04W 76/14 370/252 |
| 2011/0039495 A1* | 2/2011 | Sawai | H04W 52/325 455/62 |
| 2012/0230247 A1* | 9/2012 | Kwon | H04B 7/155 370/315 |
| 2013/0194948 A1* | 8/2013 | Mallik | H04W 36/0079 370/252 |
| 2013/0225166 A1* | 8/2013 | Akhtar | H04W 24/02 455/435.1 |
| 2013/0294331 A1* | 11/2013 | Wang | H04B 7/2606 370/315 |
| 2014/0126462 A1* | 5/2014 | Vardhan | H04W 16/26 370/315 |
| 2014/0133355 A1* | 5/2014 | Shu | H04W 48/16 370/254 |
| 2014/0153469 A1* | 6/2014 | Park | H04W 52/0216 370/311 |
| 2014/0204728 A1* | 7/2014 | Kobayashi | H04L 45/122 370/218 |
| 2015/0023185 A1* | 1/2015 | Bodas | H04W 72/0446 370/252 |
| 2015/0111608 A1* | 4/2015 | Kazmi | H04W 52/34 455/522 |
| 2016/0171486 A1* | 6/2016 | Wagner | G06Q 20/3278 705/39 |
| 2016/0381702 A1* | 12/2016 | Jeong | H04W 74/002 370/329 |

\* cited by examiner

EXAMPLE RELAY-SERVICE REGISTRATION PROCESS BY ACCESS POINT

RELAY SYSTEMS AND METHODS FOR WIRELESS NETWORKS

CROSS-REFERENCE TO RELATED APPLICATION

This application is a continuation of U.S. patent application Ser. No. 15/948,130 filed Apr. 9, 2018, which in turn is a divisional of U.S. patent application Ser. No. 14/813,154 filed Jul. 30, 2015 now U.S. Pat. No. 9,986,585, this application claims the benefit under 35 U.S.C. § 119(e) of U.S. Provisional Application No. 62/031,259, filed Jul. 31, 2014, entitled "RELAY SYSTEMS AND METHODS FOR WIRELESS NETWORKS", which is hereby incorporated by reference in its entirety.

BACKGROUND

Technical Field

The present disclosure relates generally to network management and more particularly, but not by way of limitation, to relay systems and methods for wireless networks.

History of Related Art

A typical wireless network includes an access point and a set of wireless stations. Some of the wireless stations may be closer to the access point than others (e.g., due to geographic dispersion). In addition, some of the wireless stations may be partially obstructed relative to the access point or be subject to environmental variables such as weather, atmospheric conditions, etc. The wireless stations may be powered by a limited power source such as a battery.

As the access point and the wireless stations communicate, such limited power sources may be progressively exhausted. Therefore, it can be beneficial to reduce power consumption in order to preserve each limited power source. However, as a general matter, the access point and the wireless stations cannot reduce power consumption without increasing a risk of transmission failure. For example, if the access point and/or the wireless stations were to transmit communications using reduced power levels, many of the communications may not reach their intended destinations. Such failures can be a result of geographic dispersion, obstructions, environmental factors, collisions, etc.

SUMMARY OF THE INVENTION

In one embodiment, a method is performed by a wireless station. The method includes determining that a wireless network provides relay service. The wireless network includes an access point and one or more relay nodes. The method further includes transmitting a relay-service desirability indication to the access point. The method also includes receiving a relay-service confirmation from the access point. The wireless station is operable to transmit at a first station-transmission power level during a first time period and a second station-transmission power level during a second time period. The second station-transmission power level is a reduced station-transmission power level as compared to the first station-transmission power level. In addition, the method includes transmitting an uplink transmission at the second station-transmission power level responsive to the relay-service confirmation from the access point.

In one embodiment, a method is performed by a relay device in a wireless network that includes an access point and one or more relay devices. The method includes detecting an uplink transmission transmitted by a wireless station, wherein the uplink transmission is intended for the access point and comprises an identifier of the wireless station. The method further includes determining whether to forward the uplink transmission to the access point, the determining based, at least in part, on a comparison of the identifier of the wireless station with client information in a memory of the relay device.

In one embodiment, a method is performed by a relay device in a wireless network that comprises an access point and one or more relay devices. The method includes detecting a relay-service desirability indication transmitted from a wireless station. The method further includes generating at least one link-quality-parameter measurement with respect to the wireless station. The method also includes transmitting information related to the at least one link-quality-parameter measurement to the access point. In addition, the method includes forwarding the relay-service desirability indication to the access point.

In one embodiment, a method is performed by a relay device in a wireless network that comprises an access point and one or more relay devices. The method includes detecting a downlink transmission transmitted by the access point. The downlink transmission is intended for a wireless station and includes an identifier of the wireless station. The method further includes comparing the identifier of the wireless station with client information in a memory of the relay device. In addition, the method includes, responsive to the identifier of the wireless station being found in the client information, forwarding a subsequent uplink transmission to the access point. The subsequent uplink transmission includes an acknowledgement by the wireless station of the downlink transmission.

In one embodiment, a method is performed by an access point in a wireless network. The method includes receiving an uplink transmission from a wireless station. The uplink transmission includes a relay-service desirability indication. The method further includes receiving one or more link-quality-parameter measurements relative to the uplink transmission from one or more relay devices that observe the uplink transmission. In addition, the method includes determining whether to register the wireless station for relay service based, at least in part, on an evaluation of the one or more link-quality-parameter measurements.

The above summary is not intended to represent each embodiment or every aspect of the present disclosure.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION OF ILLUSTRATIVE EMBODIMENTS

In a wireless network, an access point (AP) can exchange signals with wireless stations in range or within a coverage area thereof. Wireless stations may associate with the AP for purposes of obtaining wireless access to another network such as, for example, a wide area network (e.g., the Internet), a closed network, etc. Examples of wireless stations include a cellular phone, a smart phone, a wearable or body-borne computer, a session initiation protocol (SIP) phone, a desktop computer, a laptop computer, a tablet computer, a personal digital assistant (PDA), a global positioning system, a multimedia device, a video device, a digital audio player (e.g., MP3 player), a camera, a game console, a set-top box, or any other similar functioning device.

A particular wireless station may also be referred to by those skilled in the art as a mobile station, a subscriber station, a mobile unit, a subscriber unit, a wireless unit, a remote unit, a mobile device, a wireless device, a wireless communications device, a user device, an end-user device, a remote device, a mobile subscriber station, an access terminal, a mobile terminal, a wireless terminal, a remote terminal, a handset, a user agent, a mobile client, a client, user equipment, or as some other suitable term. A particular AP may also be referred to by those skilled in the art as a base station, a wireless AP, or as some other suitable term.

Radio frequency (RF) transmission can contribute to a majority of power consumption by wireless stations. In various embodiments, power consumption by wireless stations can be reduced in a fashion that significantly mitigates a risk of transmission failure due to collisions, environmental variables, and other factors. In a typical embodiment, a wireless network can include dedicated relay nodes (RNs) that forward uplink transmissions from wireless stations to an access point in a controlled manner. A wireless network that includes dedicated RNs may be periodically referred to herein as providing a relay service. In certain embodiments, a given wireless station can discover that relay service is offered in a given wireless network and, thereafter, initiate utilization of the relay service. Once utilization of the relay service begins, in some embodiments, the given wireless station may transmit uplink transmissions at a reduced power level and thereby conserve power, reduce a risk of collisions and interference, and/or realize other benefits.

For illustrative purposes, examples may be provided herein relative to wireless networks that implement IEEE 802.11 and related standards. However, it should be appreciated that the principles described herein are not so limited. For example, similar principles can also be applied to wireless networks that implement other communication standards such as HiperLAN, Wireless Metropolitan Area Networks (WMAN), Local Multipoint Distribution Service (LMDS), Worldwide Interoperability for Microwave Access (WiMAX), and/or the like.

Figure 1:
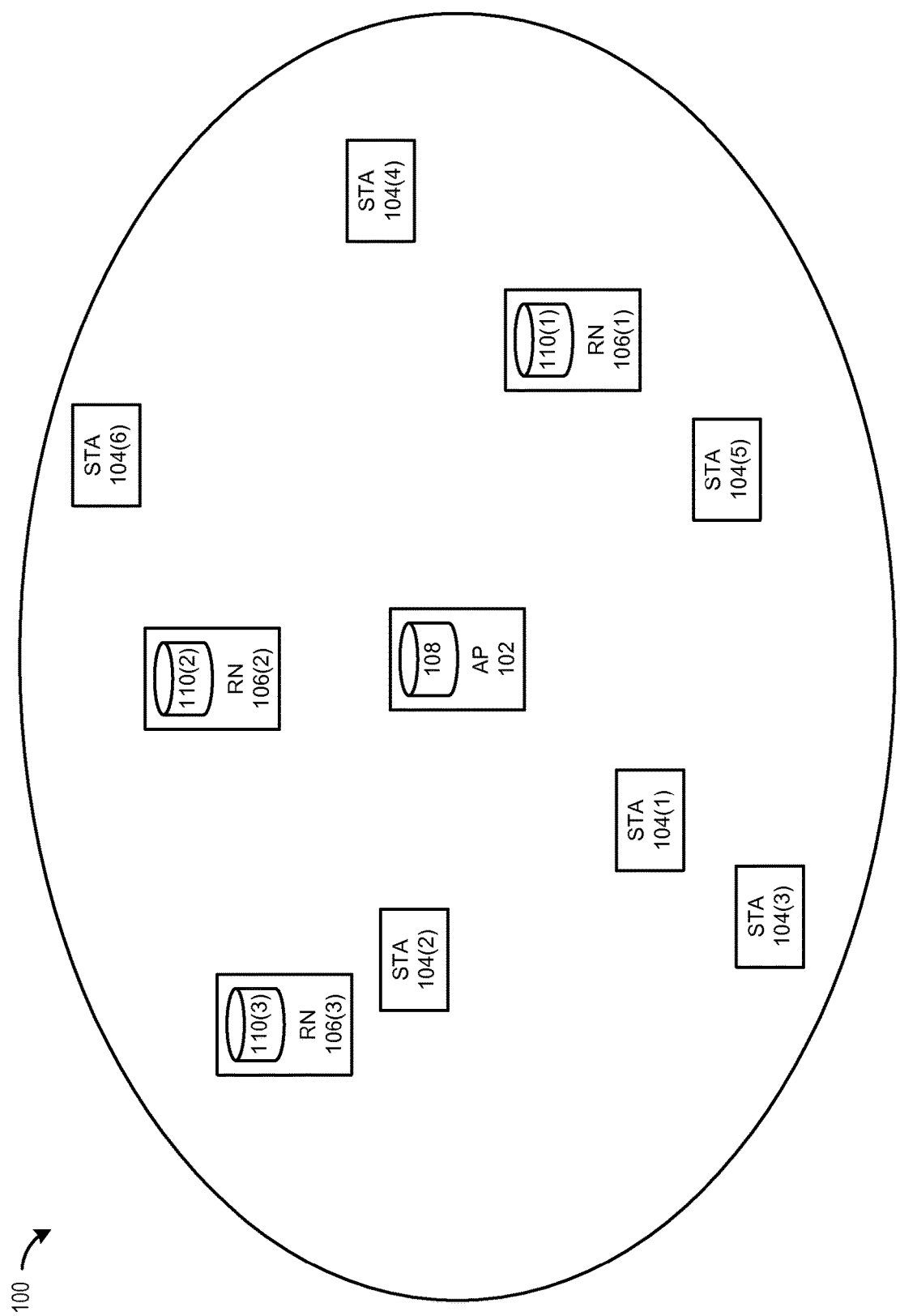
FIG. 1 illustrates an example of a wireless network.

FIG. 1 illustrates an example of a wireless network 100 that can be implemented, for example, as a basic service set (BSS) of a wireless LAN (WLAN). The wireless network 100 includes an access point (AP) 102, wireless stations 104(1), 104(2), 104(3), 104(4), 104(5), and 104(6) (collectively, wireless stations 104), and RNs 106(1), 106(2), and 106(3) (collectively, RNs 106). The wireless stations 104 are examples of wireless stations that may be located in range of the AP 102 at a given time. It should be appreciated that the number wireless stations included within the set of wireless stations 104 can dynamically change, for example, as wireless stations move in and out of range of the AP 102. In similar fashion, the RNs 106 are examples of RNs that may be in service in the wireless network 100 at a given time. Thus, it should be appreciated that the number of RNs included in the RNs 106 can vary based on time, a particular implementation, network conditions, and other factors.

The AP 102 generally allows the wireless stations 104 to connect to a wide area network such as, for example, the Internet, using one or more wireless communication standards. The one or more wireless communication standards implemented by the wireless network 100 can include, but are not limited to, WLAN (e.g., IEEE 802.11 and related standards, HiperLAN, etc.), WMAN, LMDS, WiMAX, and/or the like. For illustrative purposes, examples will be provided below relative to WLAN and, more particularly, IEEE 802.11 standards. However, it should be appreciated that the principles described herein are not so limited.

The AP 102, the wireless stations 104, and the RNs 106 may each be implemented as a computing system that is programmed or configured to perform the respective functions described herein. The computing system may include multiple distinct computers or computing devices. More particularly, each such computing system typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computing system. Where the computing system includes multiple computing devices, these devices may, but need not, be co-located. The results of the disclosed methods and tasks may be persistently stored by transforming physical storage devices, such as solid state memory chips and/or magnetic disks, into a different state. Further examples of the AP 102, the wireless stations 104, and the RNs 106 will be described with respect to FIG. 2.

In a typical embodiment, the AP 102 acts as a master to control the wireless stations 104 and provide access to one or more other networks (e.g., the wide area network mentioned above). The AP 102 can communicate with the wireless stations 104 using, for example, a combination of management frames, control frames, and data frames. Management frames are generally used to manage communications within the wireless network 100 and can include, but are not limited to, beacon frames, association request/response frames, disassociation frames, etc. Control frames (e.g. acknowledgement (ACK) frames and RTS/CTS (Request to Send/Clear to Send) frames) are typically used to facilitate exchange of data frames. Data frames can be used, for example, to convey user data between the AP 102 and the wireless stations 104.

In a typical embodiment, the AP 102 transmits a beacon frame at a periodic interval to announce a presence of the wireless network 100. The periodic interval may be referred to herein as a beacon interval. A time when a beacon frame is sent by the AP 102 may be referred to herein as a target beacon transmission time (TBTT). The beacon frame can include, for example, a timestamp, the beacon interval, and a service set identifier (SSID). In general, before data delivery through the AP 102 begins, the wireless stations 104 synchronize with the AP 102 based on the timestamp and associate with the AP 102.

By virtue of the inclusion of the RNs 106, the wireless network 100 may be considered to provide a relay service. In a typical embodiment, each of the RNs 106 registers as an RN with the AP 102 and is assigned a RN identifier (ID) such as, for example, a numeric or alphanumeric code. The RN ID of a given RN of the RNs 106 can also be, for example, a media access control (MAC) address. The AP 102 can maintain, in a memory thereof, a central registry 108 that lists each of the RNs 106. The RNs 106 can be maintained in the central registry 108, for example, as a table or list. In some embodiments, the RNs 106 are dedicated to the relay service and do not generate non-relay-related traffic. In other embodiments, the RNs 106 may not be dedicated RNs and may generate non-relay-related traffic.

In certain embodiments, the AP 102 can also use the central registry 108 to track each wireless station registered to utilize the relay service. In an example, the central registry 108 can identify each registered wireless station by a MAC address or other unique identifier. In addition, for each registered wireless station, the central registry 108 can list one or more of the RNs 106 that are assigned to forward certain transmissions involving the registered wireless station such as, for example, all or selected uplink transmissions by the registered wireless station. The registered wireless stations can be maintained in the central registry 108, for example, as a table or list.

In certain embodiments, the RNs 106(1), 106(2), and 106(3) maintain, in a memory thereof, client information 110(1), 110(2), and 110(3), respectively (collectively, client information 110). The client information 110 can specifically identify those of the wireless stations 104 for which uplink transmissions should be forwarded, or relayed, to the AP 102. For example, the client information 110(1) can identify, by a MAC address or other unique identifier, which of the wireless stations 104 should have its uplink transmissions forwarded, or relayed, by the RN 106(1) to the AP 102. The client information 110(2) and the client information 110(3) can include similar information regarding the RN 106(2) and the RN 106(3), respectively. In an example, the RNs 106 can each monitor traffic on the wireless network 100, identify uplink transmissions for wireless stations listed in the client information 110, and forward such uplink transmissions to the AP 102. In various embodiments, the client information 110 can be maintained, for example, as a table or list.

The AP 102 can periodically transmit a relay-service availability indication that announces the existence of the relay service. In some embodiments, the relay-service availability indication can be included as an information element of a management frame such as the beacon frame described above. In some embodiments, the relay-service availability indication can further indicate a reduced station-transmission power level that is appropriate if the relay service is utilized. In these embodiments, the reduced station-transmission power level may be indicated, for example, by a code or other identifier (e.g., a code specified by a standard) that the wireless stations 104 can resolve to the reduced station-transmission power level. The reduced station-transmission power level can also be indicated by explicit specification and/or in other suitable ways. In various cases, the reduced station-transmission power level can be specified by pre-configuration, a standard, etc. Alternatively, in many cases, the reduced station-transmission power level can be dynamically determined during a network-deployment process or a network-optimization process. In addition, in some embodiments, the relay-service availability indication may omit any indication of the reduced station-transmission power level. In these embodiments, the wireless stations 104, or a network element in communication with the wireless stations 104, may determine or set the reduced station-transmission power level.

During time periods (e.g., beacon intervals) when the wireless stations 104 operate in a normal station-operation mode, the wireless stations 104 typically transmit frames at a normal rate and at a normal power level. The normal rate can be specified, for example, in a mandatory rate set established at the physical layer (e.g., by an attached transceiver), by a BSS basic rate setting, and/or the like. As described above, during time periods (e.g., beacon intervals) when the wireless stations 104 utilize the relay service of the wireless network 100, the wireless stations 104 can send uplink transmissions at the reduced station-transmission power level and thereby reduce power expended relative to the normal station-operation mode. For convenient description, wireless stations actively using a relay service may be referred to herein as operating in a station power-saving mode. It should be appreciated that, in various embodiments, the wireless stations 104 may operate in the normal station-operation mode during some time periods (e.g., beacon intervals) and operate in the station power-saving mode during other time periods.

In certain embodiments, the wireless stations 104 can initiate a transition to a station power-saving mode, for example, by transmitting a relay-service desirability indication (e.g., in an association-request frame). In certain embodiments, the relay-service desirability indication may be considered a request to use the relay service. Thereafter, the AP 102 can determine, on an individual basis, whether the wireless stations 104 should utilize the relay service. The determination can be based on an evaluation of one or more link-quality-parameter measurements generated by itself and/or by one or more of the RNs 106.

In general, a link-quality parameter may indicate the quality of a communication link. In particular embodiments, a link-quality parameter may be suggestive, at least in part, of an amount of transmit power needed for a transmission to reach one or more intended destinations. For example, in certain embodiments, a link margin could be used as a link-quality parameter. The link margin, often measured in decibels, is generally a difference between a given wireless device's sensitivity (i.e., a received power at which the given wireless device would stop working) and an actual received power. According to this example, the AP 102 and/or the one or more RNs could measure link margin based on an actual received power for a received relay-service desirability indication. A link-quality parameter could also be, for example, a received channel power indicator (RCPI), a received signal-to-noise indicator (RSNI), a composite of such metrics, and/or the like.

A link-quality-parameter measurement may refer to information usable to evaluate or assess the quality of a communication link. In some cases, a given link-quality-parameter measurement may directly provide an evaluation or assessment in the form of a value. In other cases, the given link-quality-parameter measurement may include information sufficient to derive an evaluation or assessment, optionally in combination with other information. For example, if the given link-quality parameter were link margin, a link-margin value received from one of the RNs 106 could be a link-quality-parameter measurement indicative of the quality of a wireless link between that RN and a given wireless station. In many cases, however, the given link-quality parameter may be, for example, a composite of two or more metrics such as link margin, RCPI, RSNI, etc. In such cases, the link-margin value mentioned above, while still constituting a link-quality-parameter measurement, might be combined with other metrics in order to compute an evaluation or assessment of the given link-quality parameter. An evaluation or assessment of a given link-quality parameter may be referred to as a value of the link-quality parameter.

Figure 2:
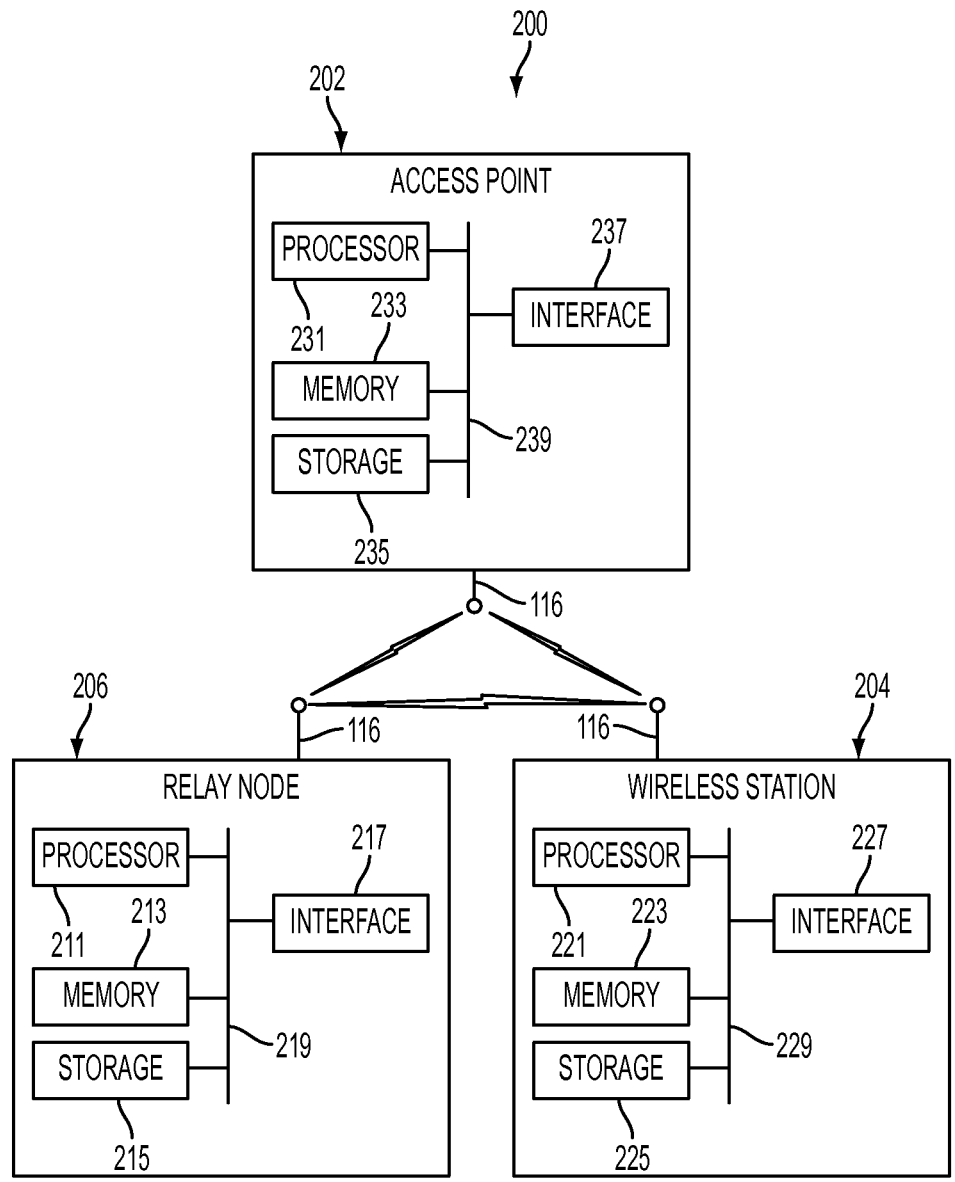
FIG. 2 illustrates an example wireless network.
Figure 3:
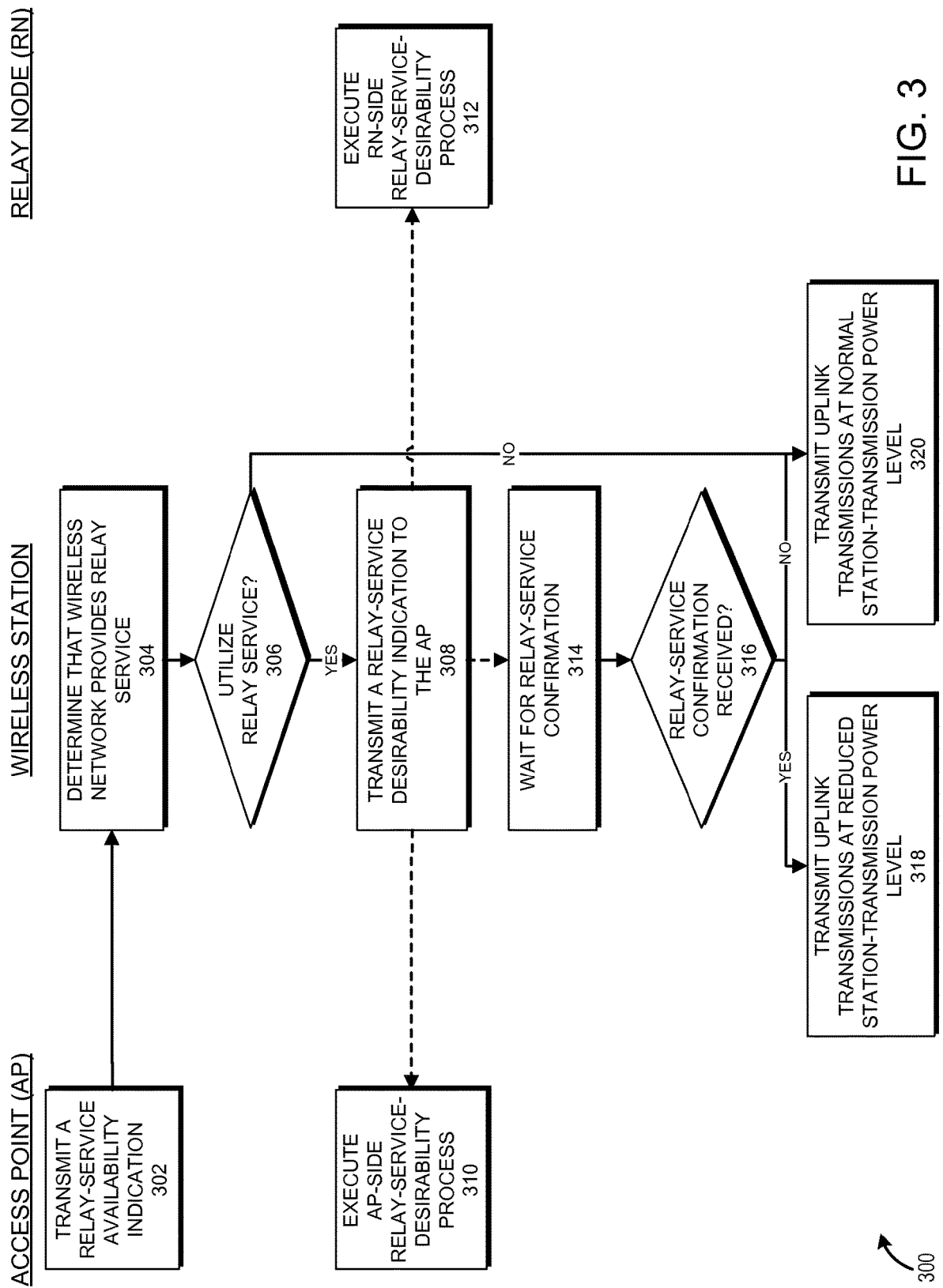
FIG. 3 illustrates an example of a process for establishing a relay service.
Figure 4:
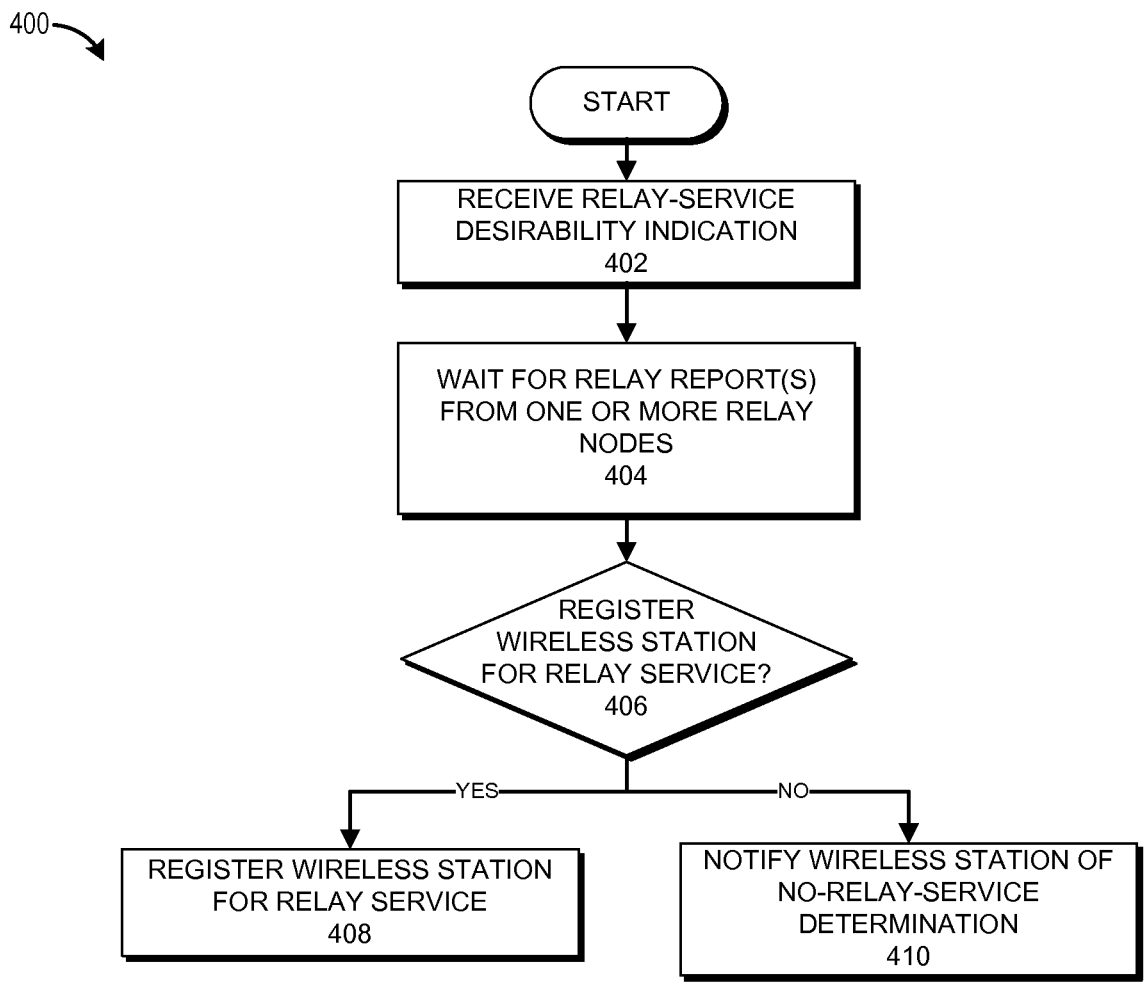
FIG. 4 illustrates an example of a process for executing an access-point-side relay-service-desirability process.
Figure 5:
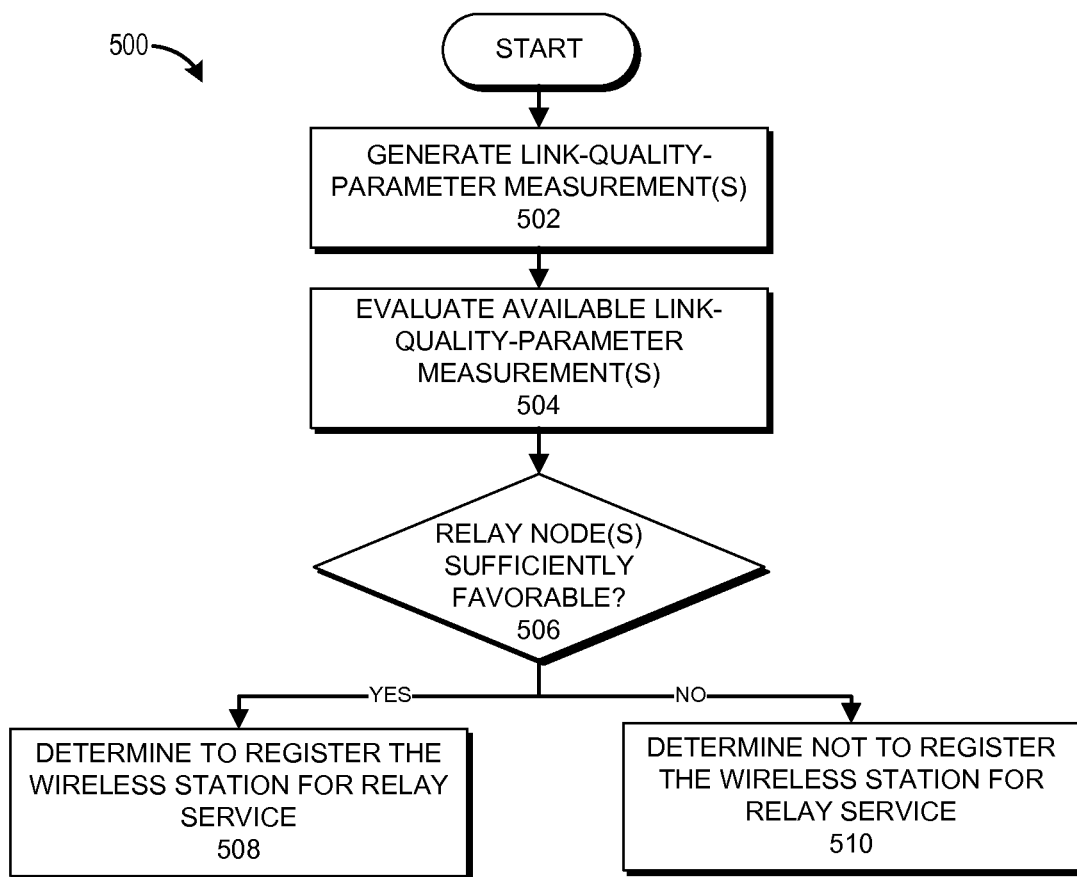
FIG. 5 illustrates an example of a process for determining whether to register a wireless station for a relay service.
Figure 6:
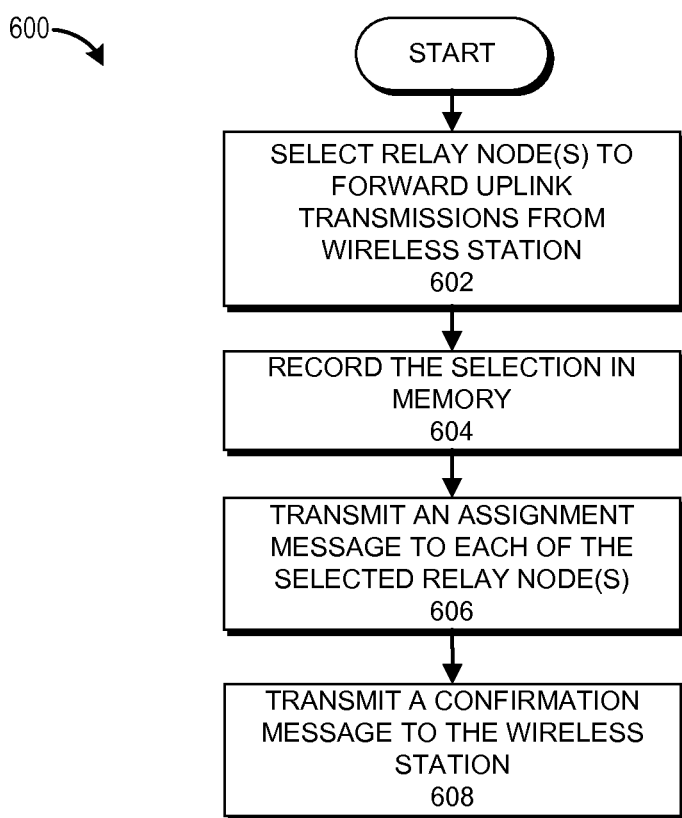
FIG. 6 illustrates an example of a process for registering a wireless station for a relay service.
Figure 7:
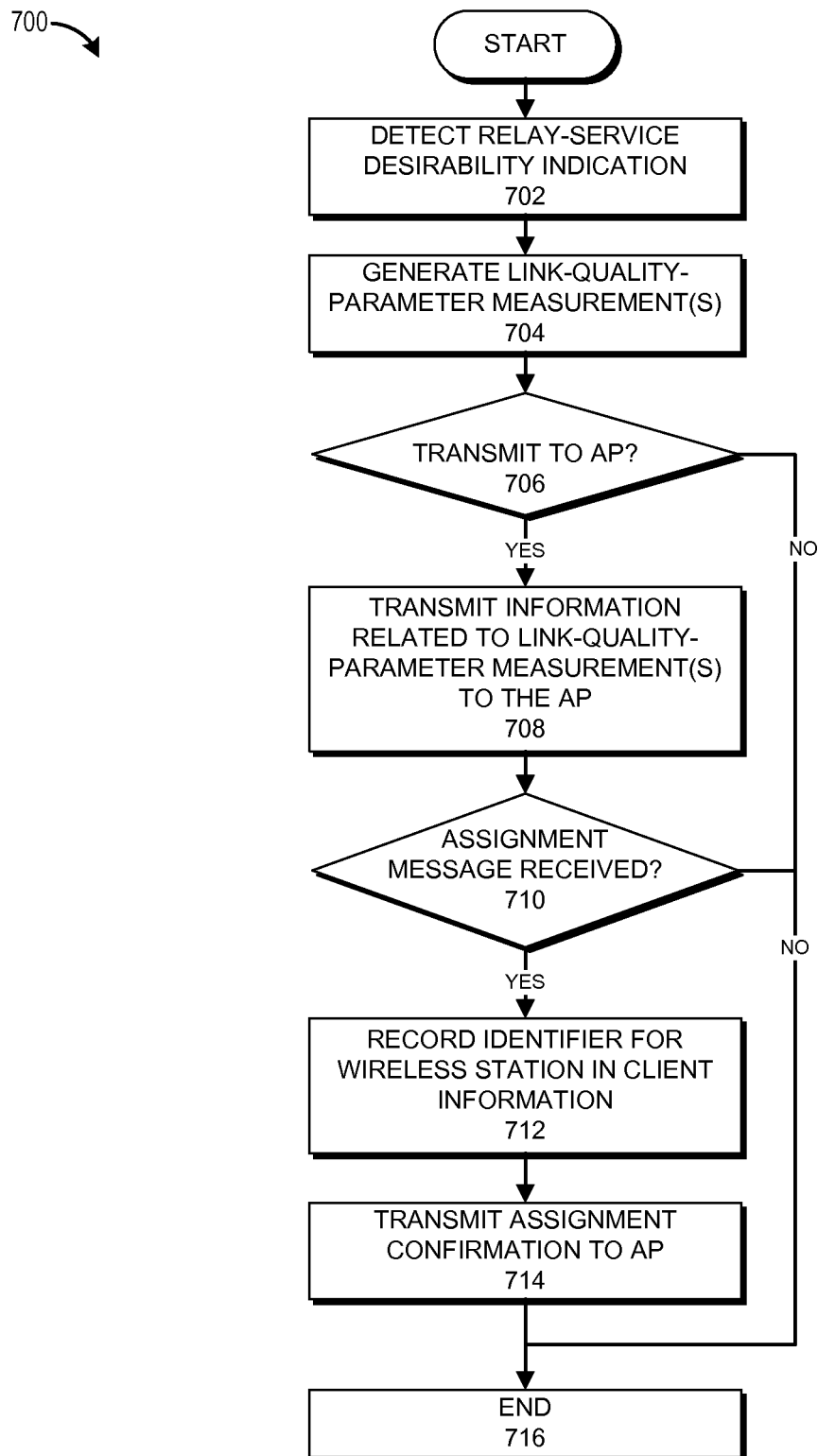
FIG. 7 illustrates an example of a process for executing an relay-node-side relay-service-desirability process.

Further examples of the wireless network 100 and the relay service will be provided in greater detail below. In particular, FIG. 2 illustrates further examples of a wireless network such as the wireless network 100. FIG. 3 illustrates an example of a relay-service establishment process for an individual wireless station. FIGS. 4-6 provide examples of AP-specific functionality during the relay-service establishment process. FIG. 7 provides examples of RN-specific functionality during the relay-service establishment process. FIGS. 8-13 illustrate examples of functionality that can be performed by the AP 102, the wireless stations 104, and/or the RNs 106 after the relay service is established.

FIG. 2 illustrates an example wireless network 200 including an example RN 206, an example wireless station 204, and an example AP 202. In general, the wireless network 200 can perform functionality described, for example, with respect to the wireless network 100 of FIG. 1. For example, the AP 202 can perform functionality described with respect to the AP 102 of FIG. 1. In like fashion, the RN 206 and the wireless station 204 can each perform functionality attributed to the RNs 106 and the wireless stations 104, respectively, of FIG. 1. For illustrative purposes, the wireless network 200 is shown to include a single RN (i.e., the RN 206) and a single wireless station (i.e., the wireless station 204). As described with respect to the wireless network 100 of FIG. 1, the wireless network 200 can include any number of wireless stations and any number of RNs.

RN 206, wireless station 204, and AP 202 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of RN 206, wireless station 204, and AP 202 may comprise any suitable physical form, configuration, number, type and/or layout. As an example, and not by way of limitation, RN 206, wireless station 204, and/or AP 202 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, RN 206, wireless station 204, and/or AP 202 may include one or more computer systems; be unitary or distributed; span multiple locations; span multiple machines; or reside in a cloud, which may include one or more cloud components in one or more networks.

In the depicted embodiment, RN 206, wireless station 204, and AP 202 each include their own respective processors 211, 221, and 231; memory 213, 223, and 233; storage 215, 225, and 235; interfaces 217, 227, and 237; and buses 219, 229, and 239. Although a particular wireless network is depicted having a particular number of particular components in a particular arrangement, this disclosure contemplates any suitable wireless network 200 having any suitable number of any suitable components in any suitable arrangement. For simplicity, similar components of RN 206, wireless station 204, and AP 202 will be discussed together while referring to the components of RN 206. However, it is not necessary for these devices to have the same components, or the same type of components. For example, processor 211 may be a general purpose microprocessor and processor 221 may be an application specific integrated circuit (ASIC).

Processor 211 may be a microprocessor, controller, or any other suitable computing device, resource, or combination of hardware, software and/or encoded logic operable to provide, either alone or in conjunction with other components, (e.g., memory 213) wireless networking functionality. Such functionality may include providing various features discussed herein. For example, processor 211 may determine an appropriate wireless-station category as described above. In particular embodiments, processor 211 may include hardware for executing instructions, such as those making up a computer program. As an example and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by RN 206, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, RN 206 may load instructions from storage 215 or another source (such as, for example, another computer system) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to RN 206, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) among RN 206, wireless station 204, AP 202, any networks, any network devices, and/or any other computer systems. As an example and not by way of limitation, communication interface 217 may include a network interface controller (NIC) or network adapter for communicating with an Ethernet or other wire-based network and/or a wireless NIC (WNIC) or wireless adapter for communicating with a wireless network.

In some embodiments, interface 217 comprises one or more radios coupled to one or more physical antenna ports 116. Depending on the embodiment, interface 217 may be any type of interface suitable for any type of network for which wireless network 200 is used. As an example and not by way of limitation, wireless network 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, wireless network 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. RN 206 may include any suitable interface 217 for any one or more of these networks, where appropriate.

In some embodiments, interface 217 may include one or more interfaces for one or more I/O devices. One or more of these I/O devices may enable communication between a person and RN 206. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 211 to drive one or more of these I/O devices. Interface 117 may include one or more interfaces 117, where appropriate.

Bus 219 may include any combination of hardware, software embedded in a computer readable medium, and/or encoded logic incorporated in hardware or otherwise stored (e.g., firmware) to couple components of RN 206 to each other. As an example and not by way of limitation, bus 219 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 219 may include any number, type, and/or configuration of buses 219, where appropriate. In particular embodiments, one or more buses 219 (which may each include an address bus and a data bus) may couple processor 211 to memory 213. Bus 219 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

FIG. 3 illustrates an example of a process 300 for establishing a relay service. The process 300 can be implemented by any system that can process information and communicate over a network. For example, the process 300, in whole or in part, can be implemented by the AP 102, any of the wireless stations 104, any of the RNs 106, the AP 202, the wireless station 204, and/or the RN 206. The process 300 can also be performed generally by the wireless network 100 or the wireless network 200. Although any number of systems, in whole or in part, can implement the process 300, to simplify discussion, the process 300 will be described in relation to specific components of the wireless network 100 of FIG. 1. For simplicity of description, the process 300 is described for an individual wireless station. In certain embodiments, the wireless network 100 can execute numerous iterations of the process 300 in parallel with respect to numerous wireless stations.

At block 302, the AP 102 transmits a relay-service availability indication. In various embodiments, the relay-service availability indication can be broadcast as part of a beacon frame as described above. At block 304, a particular wireless station of the wireless stations 104 determines that the wireless network 100 provides the relay service. In an example, the determination can directly result from the particular wireless station's receipt of the relay-service availability indication.

At decision block 306, the particular wireless station determines whether to utilize the relay service. In some cases, the determination can be based, at least in part, on a configuration option on the particular wireless station that is, for example, enabled, enabled under certain specified conditions, disabled, etc. Alternatively, or in addition, the determination can be based, at least in part, on a detected need to conserve power (e.g., due to detected battery exhaustion). The determination can also be a response to manual input from a user or administrator, an instruction from a network element coupled to the particular wireless station, and/or the like. The determination can also be based on a combination of the foregoing and/or other configurations or input. If it is determined at the decision block 306 to not utilize the relay service, the process 300 proceeds directly to block 320, where the particular wireless station continues to operate in a normal station-operation mode. Otherwise, if it is determined at decision block 306 to utilize the relay service, the process 300 proceeds to block 308.

At block 308, the particular wireless station transmits a relay-service desirability indication to the AP 102. In various embodiments, the relay-service desirability indication can be transmitted at a reduced station-transmission power level as described above. In some embodiments, the block 308 can include the particular wireless station sending an association request to the AP 102 for purposes of joining the wireless network 100. In these embodiments, the relay-service desirability indication can be included as part of the association request. The association request may be responsive, for example, to the beacon frame described above with respect to block 302. The association request can conform to any number of formats such as, for example, formats defined in IEEE 802.11 standards, with an extension for the relay-service desirability indication.

If, for example, the particular wireless station is already associated with the AP 102, the block 308 can include the particular wireless station sending a re-association request to the AP 102. In these embodiments, the relay-service desirability indication can be included as part of the re-association request. The re-association request can conform to any number of formats such as, for example, formats defined in IEEE 802.11 standards, with an extension for the relay-service desirability indication. After block 308, blocks 310, 312, and 314 may execute substantially in parallel on the AP 102, one or more of the RNs 106, and the particular wireless station, respectively.

At block 310, the AP 102 can execute an AP-side relay-service desirability process. The block 310 generally involves the AP 102 determining whether the relay service is suitable for the particular wireless station based, at least in part, on information (or a lack of information) received from the RNs 106. The information can be, for example, link-quality-parameter measurements as described above. The AP-side relay-service desirability process typically begins with receipt of the relay-service desirability indication. As described in greater detail below, in some cases the relay-service desirability indication may be received from the particular wireless station. In other cases, the relay-service desirability indication may only be received via relay from one or more of the RNs 106 (e.g., if the relay-service desirability indication is transmitted at the reduced station-transmission power level and cannot be detected by the AP 102). Examples of the AP-side relay-service desirability process will be described with respect to FIGS. 4-6.

At block 312, those of the RNs 106 that are able to detect (e.g., observe) the relay-service desirability indication can execute an RN-side relay-service desirability process. The RN-side relay-service desirability process typically begins with detection of the relay-service desirability indication. In a typical embodiment, each of the RNs 106 continuously monitors traffic on the wireless network 100 so as to detect any relay-service desirability indications that are in range thereof. The block 312 generally involves generating and providing link-quality-parameter measurement(s) to the AP 102. An example of the RN-side relay-service desirability process will be described with respect to FIG. 7.

At block 314, the particular wireless station waits for a relay-service confirmation from the AP 102. In certain embodiments, the relay-service confirmation is an indication to the particular wireless station that the relay service may be utilized. Stated somewhat differently, the relay-service confirmation, if received, generally means that the particular wireless station can transmit uplink frames at the reduced station-transmission power level.

At decision block 316, the particular wireless station determines whether a relay-service confirmation has been received from the AP 102. In various embodiments, it may be determined that no relay-service confirmation has been received if, for example, a specified period of time has passed without receipt of the relay-service confirmation from the AP 102, a notification of a no-relay-service determination has been received from the AP 102, and/or the like. If it is determined at the decision block 316 that no relay-service confirmation has been received from the AP 102, the process 300 proceeds to block 320, where the particular wireless station continues to operate in a normal station-operation mode. Otherwise, the process 300 proceeds to block 318. At block 318, the particular wireless station transmits uplink transmissions at the reduced station-transmission power level until further notice.

FIG. 4 illustrates an example of a process 400 for executing an AP-side relay-service-desirability process. In some embodiments, the process 400 can be performed as all or part of block 310 of FIG. 3. The process 400 can be implemented by any system that can process information and communicate over a network. For example, the process 400, in whole or in part, can be implemented by the AP 102 and/or the AP 202. The process 400 can also be performed generally by the wireless network 100 or the wireless network 200. Although any number of systems, in whole or in part, can implement the process 400, to simplify discussion, the process 400 will be described in relation to specific components of the wireless network 100 of FIG. 1.

At block 402, the AP 102 receives a relay-service desirability indication in relation to a particular wireless station of the wireless stations 104. In some cases, the relay-service desirability indication can be directly received from the particular wireless station as transmitted, for example, at the block 308 of FIG. 3. In other cases, the relay-service desirability indication can be received by relay from one or more of the RNs 106. In many cases, the AP 102 can receive the relay-service desirability indication from both the particular wireless station and one or more of the RNs 106. As noted above, in some embodiments, the relay-service desirability indication can be contained within an association request or a re-association request.

At block 404, the AP 102 waits for relay reports from the RNs 106. A relay report can include, for example, the relay-service desirability indication, an RN ID, one or more link-quality-parameter measurements, a combination of same, and/or other information. In embodiments where the relay-service desirability indication is originally transmitted by the particular wireless station as part of an association or re-association request, the relay report can be an association report. The association report can include, for example, the association or re-association request, an RN ID, one or more link-quality-parameter measurements, a combination of same, and/or other information. In cases where the relay-service desirability indication is only received via one or more of the RNs 106, the blocks 402 and 404 may occur substantially concurrently via receipt of a single transmission from one or more of the RNs 106.

At decision block 406, the AP 102 determines whether to register the particular wireless station for the relay service based, at least in part, on information (or a lack of information) received from the RNs 106. An example of processing that can occur at the decision block 406 will be described with respect to FIG. 5. If it is determined at the decision block 406 to register the particular wireless station for the relay service, the process 400 proceeds to block 408. At block 408, the AP 102 registers the particular wireless station for the relay service. An example of registration functionality will be described with respect to FIG. 6.

Otherwise, if it is determined at the decision block 406 to not register the particular wireless station for the relay service, the process 400 proceeds to block 410. At block 410, the AP 102 notifies the particular wireless station of the no-relay-service determination. In some embodiments, the block 410 can be omitted so that, for example, the particular wireless station can infer the no-relay-service determination from the absence of any relay-service confirmation.

FIG. 5 illustrates an example of a process 500 for determining whether to register a wireless station for a relay service. In some embodiments, the process 500 can be performed as all or part of the decision block 406 of FIG. 4. The process 500 can be implemented by any system that can process information and communicate over a network. For example, the process 500, in whole or in part, can be implemented by the AP 102 and/or the AP 202. The process 500 can also be performed generally by the wireless network 100 or the wireless network 200. Although any number of systems, in whole or in part, can implement the process 500, to simplify discussion, the process 500 will be described in relation to specific components of the wireless network 100 of FIG. 1.

At block 502, the AP 102 generates one or more link-quality-parameter measurements relative to a relay-service desirability indication received from a particular wireless station of the wireless stations 104. As mentioned above, in some cases, the AP 102 may not receive the relay-service desirability indication directly from the particular wireless station (e.g., if the relay-service desirability indication is transmitted by the particular at a reduced station-transmission power level and cannot be detected by the AP 102). In these cases, the block 502 may be omitted so that no link-quality-parameter measurements are generated by the AP 102.

At block 504, the AP 102 evaluates available link-quality-parameter measurements with respect to the particular wireless station. The available link-quality-parameter measurements can include, for example, any link-quality-parameter measurements generated at the block 502, any link-quality-parameter measurements received from the RNs 106 during, for example, block 404 of the process 400, etc. In general, the evaluation involves comparing and, in some cases, ranking or sorting the available link-quality-parameter measurements (e.g., ranking or sorting by link margin). To the extent the available link-quality-parameter measurements include both link-quality-parameter measurement(s) generated at the block 502 and link-quality-parameter measurement(s) received from one or more of the RNs 106, the block 504 can include comparing the AP-generated link-quality-parameter measurement(s) with the received link-quality-parameter measurement(s) to determine, for example, whether there appears to be an advantage to the particular wireless station utilizing the relay service.

At decision block 506, the AP 102 determines whether any of the RNs 106 are sufficiently favorable as compared to the AP 102 so as to merit the particular wireless station utilizing the relay service. In general, a sufficiently favorable RN provides link-quality-parameter measurement(s) that are measurably more advantageous than those generated by the AP 102. In cases where the AP 102 is not able to directly receive the relay-service desirability indication from the particular wireless station (e.g., due to its transmission at a reduced station-transmission power level), the decision block 506 typically results in an affirmative determination. Conversely, in cases where the AP 102 does not receive a relay report from any of the RNs 106, the decision block 506 typically results in a negative determination.

In cases where the AP 102 both directly receives the relay-service desirability indication from the particular wireless station and receives relay report(s) from the RNs 106, the AP 102 may apply various standards to determine whether there are any sufficiently favorable RNs. In an example, if the AP 102 determines from the AP-generated link-quality-parameter measurements that a link quality between the AP 102 and the particular wireless station is sufficient to provide expected performance (e.g., an expected data rate), it may be determined that none of the RNs 106 is sufficiently favorable. In addition, or alternatively, the AP 102 may require that a sufficiently favorable RN provide link-quality-parameter measurement(s) (e.g., a link-margin value) that are at least a configurable minimum amount better than a corresponding link-quality-parameter measurement generated by the AP 102. The AP 102 can also determine sufficient favorability in other ways that will be apparent to one skilled in the art after reviewing the present disclosure.

If it is determined at the decision block 506 that there is at least one sufficiently favorable RN of the RNs 106, the process 500 proceeds to block 508. At block 508, the AP 102 determines to register the particular wireless station for the relay service. If it is determined at the decision block 506 that there is not at least one sufficiently favorable RN of the RNs 106, the process 500 proceeds to block 510. At block 510, the AP 102 determines not to register the particular wireless station for the relay service.

FIG. 6 illustrates an example of a process 600 for registering a wireless station for a relay service. In some embodiments, the process 600 can be performed as all or part of block 408 of FIG. 4. The process 600 can be implemented by any system that can process information and communicate over a network. For example, the process 600, in whole or in part, can be implemented by the AP 102 and/or the AP 202. The process 600 can also be performed generally by the wireless network 100 or the wireless network 200. Although any number of systems, in whole or in part, can implement the process 600, to simplify discussion, the process 600 will be described in relation to specific components of the wireless network 100 of FIG. 1.

At block 602, the AP 102 selects one or more of the RNs 106 to forward uplink transmissions by a particular wireless station of the wireless stations 104. In various embodiments, the AP 102 may select one, two, three, or any other number of the RNs 106 that may be advantageous for a given implementation. In various embodiments, selection of more than one of the RNs 106 can improve the quality of received signals through spatial diversity. In an example, the AP 102 may select a most favorable RN, or a set of most favorable RNs, as measured by a representative link-quality-parameter measurement (e.g., link-margin value).

At block 604, the AP 102 records the selection in the central registry 108. For example, the AP 102 can record an entry that maps an identifier of the particular wireless station (e.g., a MAC address) to an identifier of each selected RN (e.g., RN ID). At block 606, the AP 102 transmits an assignment message to each selected RN. For each selected RN, the assignment message can include, for example, an identifier of the particular wireless station (e.g., a MAC address) and an identifier of the selected RN (e.g., a RN ID) so as to indicate the assignment. In some embodiments, the AP 102 may receive an assignment confirmation from each selected RN.

At block 608, the AP 102 transmits a relay-service confirmation to the particular wireless station. In some embodiments, the relay-service confirmation can specify a data rate for uplink transmission. In cases where the wireless station originally transmitted a relay-service desirability indication within an association or re-association request, the relay-service confirmation can be contained within an association response. The association response can conform to any number of formats such as, for example, formats defined in IEEE 802.11 standards, with an extension to confirm the relay service and include any additional information (e.g., the data rate for uplink transmission).

FIG. 7 illustrates an example of a process 700 for executing an RN-side relay-service-desirability process. In some embodiments, the process 700 can be performed as all or part of block 312 of FIG. 3. The process 700 can be implemented by any system that can process information and communicate over a network. For example, the process 700, in whole or in part, can be implemented by any of the RNs 106 and/or the RN 206. The process 700 can also be performed generally by the wireless network 100 or the wireless network 200. Although any number of systems, in whole or in part, can implement the process 700, to simplify discussion, the process 700 will be described in relation to specific components of the wireless network 100 of FIG. 1.

At block 702, a particular RN of the RNs 106 detects a relay-service desirability indication transmitted by a particular wireless station of the wireless stations 104. In various embodiments, the detected relay-service desirability indication may have been transmitted by the particular wireless station as described with respect to block 308 of FIG. 3.

At block 704, the particular RN generates one or more link-quality-parameter measurements. In general, the block 704 involves carrying out a measurement to yield the one or more link-quality-parameter measurements. The link-quality-parameter measurement can take the form of a measurement report. For example, in some embodiments, the particular RN may measure link margin based on an actual received power for the relay-service desirability indication.

At decision block 706, the particular RN determines whether to transmit information related to the generated link-quality-parameter measurement(s) to the AP 102. In certain embodiments, the decision block 706 can involve comparing the generated link-quality-parameter measurement(s) to one or more threshold values. In an example, if the generated link-quality-parameter measurement(s) include a link-margin value, the link-margin value can be compared to a predetermined threshold value. According to this example, if the link-margin value is greater than or equal to the predetermined threshold value, the particular RN may reach an affirmative determination at the decision block 706. Otherwise, the particular RN may reach a negative determination. In certain embodiments, a comparison to a predetermined threshold value can ensure that a wireless link between the particular wireless station and the particular RN is of at least certain minimal quality before transmitting any information to the AP 102.

If it is determined at the decision block 706 to not transmit any information to the AP 102, the process 700 proceeds to block 716 and ends. Otherwise, the process 700 proceeds to block 708. At block 708, the particular RN transmits information related to the generated link-quality-parameter measurement(s) to the AP 102. In an example, the block 708 can involve transmitting a relay report as described above with respect to block 404 of FIG. 4. In embodiments where the relay-service desirability indication is originally transmitted by the particular wireless station as part of an association or re-association request, the relay report can be an association report. The association report can include, for example, the association or re-association request, an RN ID for the particular RN, the generated link-quality-parameter measurement(s) (e.g., a measurement report), a combination of same, and/or other information.

At decision block 710, the particular RN determines whether an assignment message relative to the particular wireless station has been received from the AP 102. In certain embodiments, the assignment message can take the form described with respect to block 606 of FIG. 6. In various embodiments, if no assignment message is received, for example, after a certain period of time, it may be determined that no assignment message has been received. If it is determined at the decision block 710 that no assignment message has been received, the process 700 proceeds to block 718 and ends. Otherwise, if it is determined at the decision block 710 that an assignment message has been received, the process 700 proceeds to block 712.

At block 712, the particular RN records an identifier of the particular wireless station (e.g., a MAC address) in client information in a memory thereof (e.g., the client information 110 of FIG. 1). In a typical embodiment, the identifier of the particular wireless station can be extracted from the assignment message. At block 714, the particular RN transmits an assignment confirmation to the AP 102. In some embodiments, block 714 may be omitted. At block 716, the process 700 ends.

Figure 8:
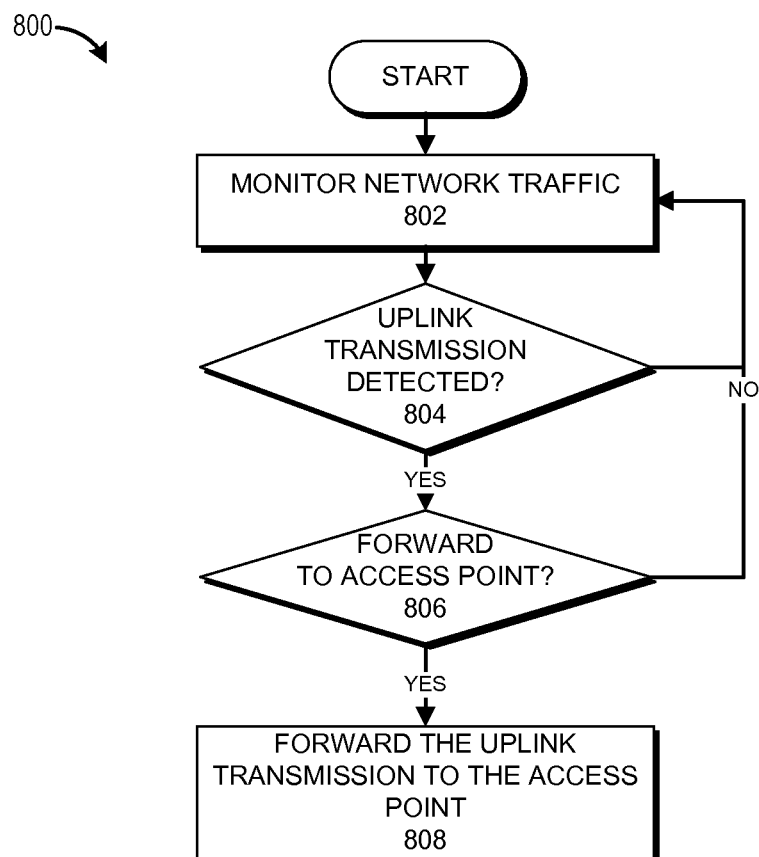
FIG. 8 illustrates an example of a process for monitoring network traffic and forwarding uplink transmissions.

FIG. 8 illustrates an example of a process 800 for monitoring network traffic and forwarding, or relaying, uplink transmissions. The process 800 can be implemented by any system that can process information and communicate over a network. For example, the process 800, in whole or in part, can be implemented by any of the RNs 106 and/or the RN 206. The process 800 can also be performed generally by the wireless network 100 or the wireless network 200. Although any number of systems, in whole or in part, can implement the process 800, to simplify discussion, the process 800 will be described in relation to specific components of the wireless network 100 of FIG. 1.

At block 802, a particular RN of the RNs 106 monitors traffic on the wireless network 100. At decision block 804, the particular RN determines whether an uplink transmission intended for the AP 102 has been detected. If not, the process 800 returns to block 802 and proceeds as described above. Otherwise, if it is determined at decision block 804 that an uplink transmission intended for the AP 102 has been detected, the process 800 proceeds to decision block 806.

At decision block 806, the particular RN determines whether to forward, or relay, the uplink transmission to the AP 102. In certain embodiments, the particular RN determines to forward the uplink transmission to the AP 102 if a particular wireless station of the wireless stations 104 that transmitted the uplink transmission is identified in the particular RN's client information (e.g., the client information 110). In an example, the decision block 806 can include the particular RN looking up an identifier of the particular wireless station in its client information. According to this example, the particular RN can determine to forward the uplink transmission responsive to the identifier of the particular wireless station being found in its client information. The identifier of the particular wireless station can be, for example, a MAC address or other information sufficient to distinguish the particular wireless station from others of the wireless stations 104. In a typical embodiment, the identifier of the particular wireless station can be extracted from the uplink transmission (e.g., from a transmitter address field in a frame of the uplink transmission).

If it is determined at the decision block 806 to not forward the uplink transmission (e.g., because the identifier of the particular wireless station is not found in the particular RN's client information), the process 800 returns to block 802 and proceeds as described above. Otherwise, if it is determined at the decision block 806 to forward the uplink transmission, the process 800 proceeds to block 808. At block 808, the particular RN forwards, or relays, the uplink transmission to the AP 102. In a typical embodiment, the particular RN behaves as the particular wireless station when forwarding the uplink transmission.

In some embodiments, the particular RN can forward the uplink transmission according to the procedures of distributed coordination function (DCF) as defined in IEEE 802.11. In an example, if the uplink transmission to be forwarded is a data frame, a management frame, or a control frame such as a RTS frame, the particular RN can use DCF interframe space (DIFS) when forwarding the data frame or the management frame. In another example, if the uplink transmission to be forwarded is a control frame such as an ACK frame or a CTS frame that is a response to a RTS frame, the particular RN can use short interframe space (SIFS) when forwarding the control frame.

In some embodiments, the particular RN can forward the uplink transmission without modifying the frame of the uplink transmission. For example, the frame forwarded by the particular RN can be in the same format as it was received by the particular RN. In other embodiments, the particular RN may change the frame of the uplink transmission before it forwards the uplink transmission. In one example, the particular RN may modify at least one field of the received frame of the uplink transmission. A detailed example will be provided relative to FIG. 12. In another example, the particular RN may add at least one field to the received frame of the uplink transmission. For example, the particular RN may add its identity as a field to the received frame of the uplink transmission and then forward the modified frame of the uplink transmission to the AP.

In various embodiments, the process 800 can continue indefinitely until terminated (e.g., by a user or administrator) or stop criteria is met.

Figure 9:
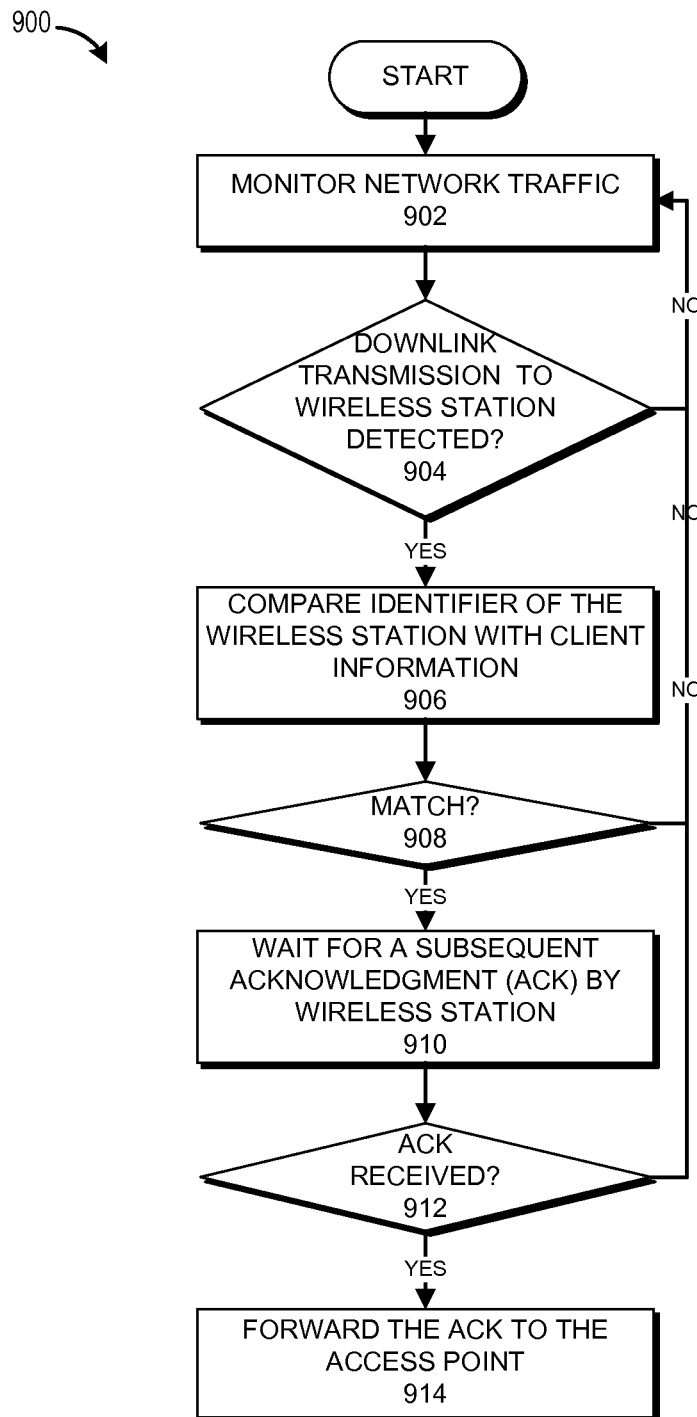
FIG. 9 illustrates an example of a process for monitoring network traffic and forwarding acknowledgements of downlink transmissions.

FIG. 9 illustrates an example of a process 900 for monitoring network traffic and forwarding, or relaying, acknowledgements (ACKs) of downlink transmissions. The process 900 can be implemented by any system that can process information and communicate over a network. For example, the process 900, in whole or in part, can be implemented by any of the RNs 106 and/or the RN 206. The process 900 can also be performed generally by the wireless network 100 or the wireless network 200. Although any number of systems, in whole or in part, can implement the process 900, to simplify discussion, the process 900 will be described in relation to specific components of the wireless network 100 of FIG. 1.

At block 902, a particular RN of the RNs 106 monitors traffic on the wireless network 100. At decision block 904, the particular RN determines whether a downlink transmission from the AP 102 to a particular wireless station of the wireless stations 104 has been detected. If not, the process 900 returns to block 902 and proceeds as described above. Otherwise, if it is determined at decision block 904 that a downlink transmission from the AP 102 to a particular wireless station of the wireless stations 104 has been detected, the process 900 proceeds to block 906.

At block 906, the particular RN compares an identifier of the particular wireless station with the particular RN's client information (e.g., the client information 110 of FIG. 1). The identifier of the particular wireless station can be, for example, a MAC address or other information sufficient to distinguish the particular wireless station from others of the wireless stations 104. In a typical embodiment, the identifier of the particular wireless station can be extracted from the downlink transmission (e.g., from a receiver address field in a frame of the downlink transmission).

At decision block 908, the particular RN determines whether the identifier of the particular RN matches an entry in the particular RN's client information. If it is determined at the decision block 908 that the identifier of the particular wireless station does not match any entry in the particular RN's client information, the process 900 returns to block 902 and proceeds as described above. Otherwise, if the identifier of the particular wireless station matches an entry in the particular RN's client information, the process 900 proceeds to block 910.

At block 910, the particular RN waits for an ACK by the particular wireless station of the downlink transmission. At decision block 912, the particular RN determines whether an ACK from the particular wireless station has been received. In various embodiments, if no ACK is detected within a configurable period of time, the particular RN determines that no ACK has been received. If it is determined at the decision block 912 that no ACK from the particular wireless station has been received, the process 900 returns to block 902 and proceeds as described above.

Otherwise, if it is determined at the decision block 912 that an ACK from the particular wireless station has been received, the process 900 proceeds to block 914. At block 914, the particular RN forwards, or relays, the ACK to the AP 102. In a typical embodiment, the particular RN behaves as the particular wireless station when forwarding the ACK frame. In some embodiments, the particular RN can forward the ACK according to the procedures of distributed coordination function (DCF) as defined in IEEE 802.11. For example, the particular RN can use SIFS when forwarding the ACK frame. In various embodiments, the process 900 can continue indefinitely until terminated (e.g., by a user or administrator) or stop criteria is met.

Figure 10:
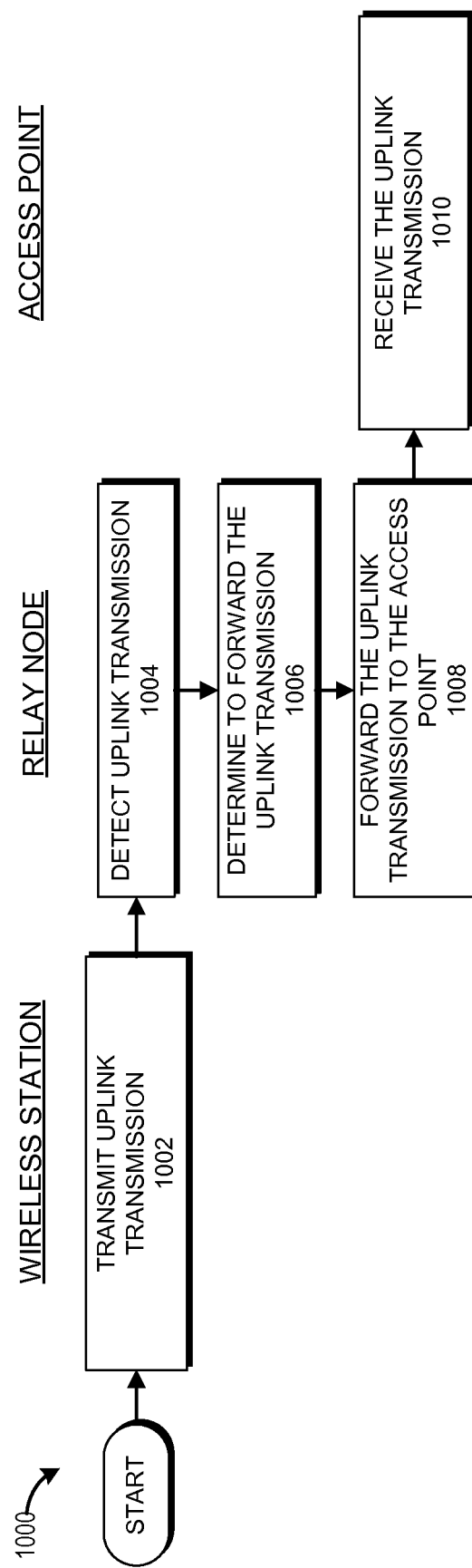
FIG. 10 illustrates an example of an end-to-end process for relaying uplink transmissions.

FIG. 10 illustrates an example of an end-to-end process 1000 for relaying uplink transmissions. In a typical embodiment, the process 1000 executes after relay service has been established as described, for example, with respect to FIGS. 2-7. The process 1000 can be implemented by any system that can process information and communicate over a network. For example, the process 1000, in whole or in part, can be implemented by one or more of the AP 102, any of the wireless stations 104, any of the RNs 106, the AP 202, the wireless station 204, and/or the RN 206. The process 1000 can also be performed generally by the wireless network 100 or the wireless network 200. Although any number of systems, in whole or in part, can implement the process 1000, to simplify discussion, the process 1000 will be described in relation to specific components of the wireless network 100 of FIG. 1.

At block 1002, a particular wireless station of the wireless stations 104 transmits an uplink transmission, for example, at a reduced station-transmission power level as described above. For purposes of the example of FIG. 10, it is assumed that relay service has been established for the particular wireless station as described, for example, with respect to FIGS. 2-7. Advantageously, in certain embodiments, the particular wireless station can transmit the uplink transmission for forwarding without identifying any of the RNs 106. In that way, in certain embodiments, the mechanics of administering the relay service can be offloaded to a combination of the RNs 106 and the AP 102.

At block 1004, at least one RN of the RNs 106 detects the uplink transmission. At block 1006, the at least one RN determines to forward the uplink transmission to the AP 102 as described, for example, with respect to FIGS. 8-9. At block 1008, the at least one RN forwards the uplink transmission to the AP 102 as described, for example, with respect to blocks 808 and 914 of FIGS. 8 and 9, respectively. At block 1010, the AP 102 receives the uplink transmission via the at least one RN.

Figure 11:
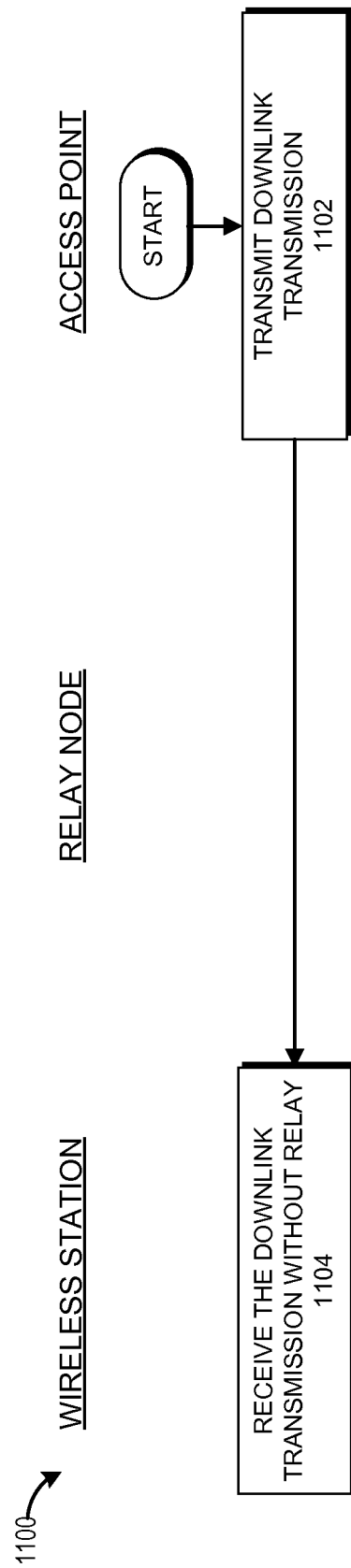
FIG. 11 illustrates an example of an end-to-end process for sending downlink transmissions to wireless stations.

FIG. 11 illustrates an example of an end-to-end process 1100 for sending downlink transmissions to wireless stations. In a typical embodiment, the process 1100 executes after relay service has been established as described, for example, with respect to FIGS. 2-7. The process 1100 can be implemented by any system that can process information and communicate over a network. For example, the process 1100, in whole or in part, can be implemented by one or more of the AP 102, any of the wireless stations 104, any of the RNs 106, the AP 202, the wireless station 204, and/or the RN 206. The process 1100 can also be performed generally by the wireless network 100 or the wireless network 200. Although any number of systems, in whole or in part, can implement the process 1100, to simplify discussion, the process 1100 will be described in relation to specific components of the wireless network 100 of FIG. 1.

At block 1102, the AP 102 transmits a downlink transmission intended for a particular wireless station of the wireless stations 104. At block 1104, the particular wireless station receives the downlink transmission directly from the AP 102 without relay. Advantageously, in certain embodiments, direct transmission of downlink transmissions by the AP 102 to the wireless stations 104 as described herein can reduce the resource cost (e.g., in time domain and/or frequency domain) of relay service. The RNs 106 can monitor the downlink transmission from the AP 102 to the particular wireless station as described, for example, with respect to FIG. 9.

RTS/CTS as defined, for example, in IEEE 802.11, can be used to reduce a risk of frame collisions in wireless networks if a wireless station has a pending data frame or a management frame to transmit. In general, however, RTS messages originated by wireless stations contain a duration field. As defined in IEEE 802.11, the duration value in the duration field is the aggregate time required to transmit the pending data frame or management frame, one CTS frame, and one ACK frame, plus three SIFS intervals. In certain embodiments, the duration value can be adjusted to reflect delay due to relay operation.

In certain embodiments, RTS/CTS functionality can be adapted so as to accommodate network delay attributable to the relay service without requiring wireless stations to have specific knowledge of relay delay. In various embodiments, relay delay can be accommodated via relay-delay-accommodation functionality on a RN such as, for example, one of the RNs 106 and/or via relay-delay-accommodation functionality on an AP such as, for example, the AP 102. In that way, wireless stations such as the wireless stations 104 can set the duration field of RTS messages without regard to relay delay and without experiencing adverse effects due to ignoring relay delay. Examples will be provided below relative to FIGS. 12-13.

Figure 12:
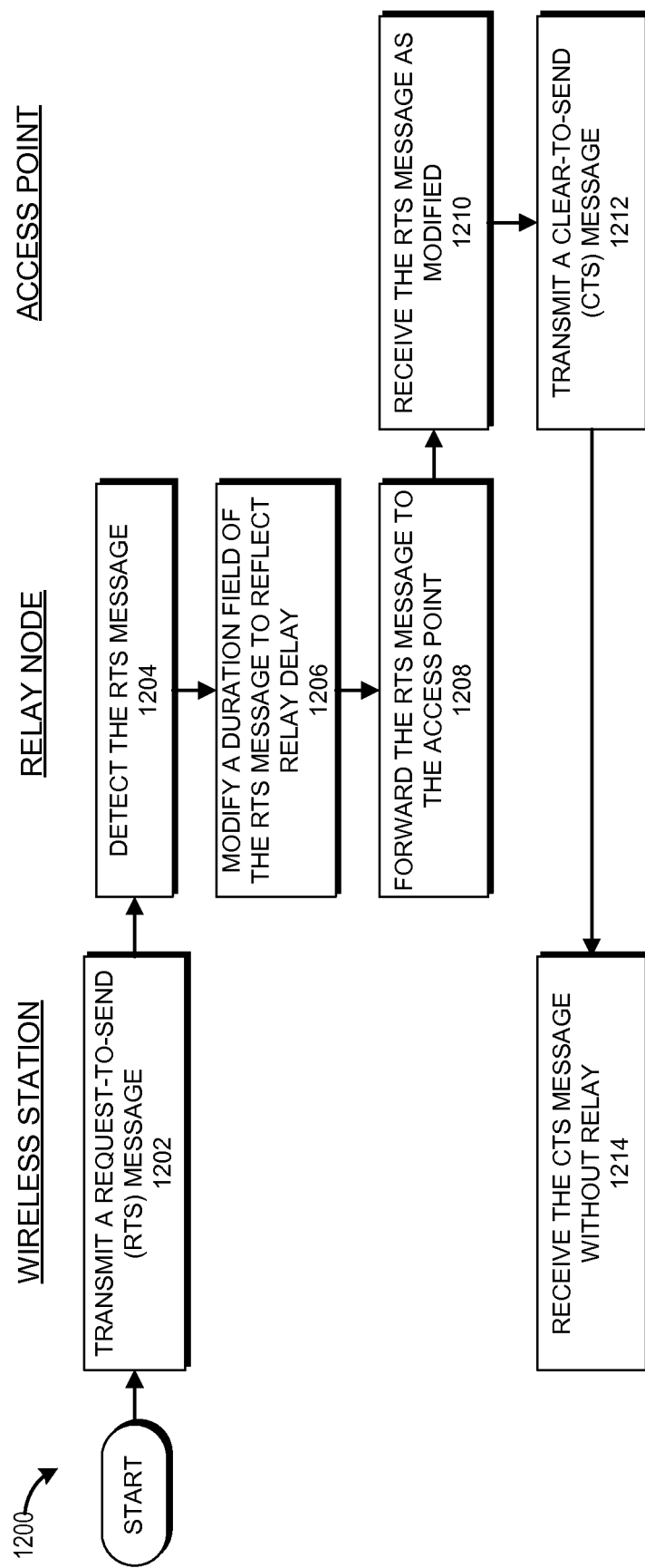
FIG. 12 illustrates an example of a process for a relay node adapting RTS/CTS (Request to Send/Clear to Send) functionality to accommodate relay service.

FIG. 12 illustrates an example of a process 1200 for an RN adapting RTS/CTS functionality to accommodate relay service. In a typical embodiment, the process 1200 executes after relay service has been established as described, for example, with respect to FIGS. 2-7. The process 1200 can be implemented by any system that can process information and communicate over a network. For example, the process 1200, in whole or in part, can be implemented by one or more of the AP 102, any of the wireless stations 104, any of the RNs 106, the AP 202, the wireless station 204, and/or the RN 206. The process 1200 can also be performed generally by the wireless network 100 or the wireless network 200. Although any number of systems, in whole or in part, can implement the process 1200, to simplify discussion, the process 1200 will be described in relation to specific components of the wireless network 100 of FIG. 1.

At block 1202, a particular wireless station of the wireless stations 104 transmits a RTS message, for example, at a reduced station-transmission power level as described above. For purposes of the example of FIG. 12, it is assumed that relay service has been established for the particular wireless station as described, for example, with respect to FIGS. 2-7. At block 1204, at least one RN of the RNs 106 detects the RTS message. At block 1206, the at least one RN modifies a duration field of the RTS message to reflect expected relay delay. In various embodiments, the expected relay delay can be configured by an administrator or other user, dynamically determined as a result of monitoring network traffic, and/or in other ways.

At block 1208, the at least one RN forwards the RTS message to the AP 102. At block 1210, the AP 102 receives the RTS message, for example, as modified at block 1206. At block 1212, the AP 102 transmits a CTS message to the particular wireless station. The CTS message can include a duration value calculated based on the modified duration value received from the RTS message forwarded by the at least one RN. At block 1214, the particular wireless station receives the CTS message without relay. Advantageously, in certain embodiments, direct transmission of CTS messages by the AP 102 to the wireless stations 104 as described herein can reduce the resource cost (e.g., in time domain and/or frequency domain) of relay service.

Figure 13:
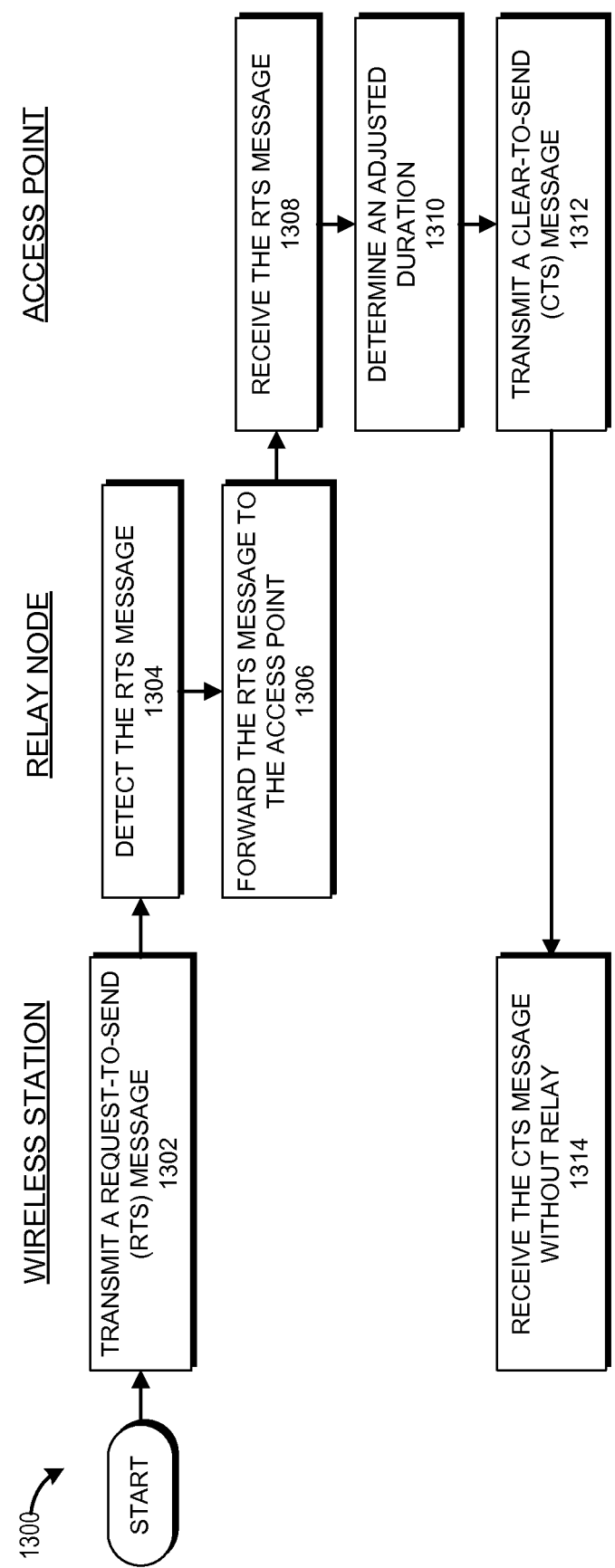
FIG. 13 illustrates an example of a process for an access point adapting RTS/CTS functionality to accommodate relay service.

FIG. 13 illustrates an example of a process 1300 for an AP adapting RTS/CTS functionality to accommodate relay service. In a typical embodiment, the process 1300 executes after relay service has been established as described, for example, with respect to FIGS. 2-7. The process 1300 can be implemented by any system that can process information and communicate over a network. For example, the process 1300, in whole or in part, can be implemented by one or more of the AP 102, any of the wireless stations 104, any of the RNs 106, the AP 202, the wireless station 204, and/or the RN 206. The process 1300 can also be performed generally by the wireless network 100 or the wireless network 200. Although any number of systems, in whole or in part, can implement the process 1300, to simplify discussion, the process 1300 will be described in relation to specific components of the wireless network 100 of FIG. 1.

At block 1302, a particular wireless station of the wireless stations 104 transmits a RTS message, for example, at a reduced station-transmission power level as described above. For purposes of the example of FIG. 13, it is assumed that relay service has been established for the particular wireless station as described, for example, with respect to FIGS. 2-7. At block 1304, at least one RN of the RNs 106 detects the RTS message. At block 1306, the at least one RN forwards the RTS message to the AP 102. At block 1308, the AP 102 receives the RTS message.

At block 1310, the AP 102 determines an adjusted duration value. For example, the adjusted duration value can be based on a duration value contained in a duration field of the RTS message. The duration value can be adjusted to reflect an expected relay delay due to relay operation. In various embodiments, the expected relay delay can be configured by an administrator or other user, dynamically determined as a result of observing network traffic, and/or in other ways. At block 1312, the AP 102 transmits a CTS message that includes the determined adjusted duration value to the particular wireless station. At block 1314, the particular wireless station receives the CTS message without relay. Advantageously, in certain embodiments, direct transmission of CTS messages by the AP 102 to the wireless stations 104 as described herein can reduce the resource cost (e.g., in time domain and/or frequency domain) of relay service.

FIGS. 12-13 are described above as illustrative examples of adjusting durations, or timers, to facilitate RTS/CTS functionality. It should be appreciated that, in certain embodiments, timers, durations, and/or the like may be used for other purposes besides RTS/CTS functionality. Such durations and timers can be adjusted or modified to reflect delay due to relay operation in a fashion similar to that which is described above with respect to FIGS. 12-13. In various cases, the modification or adjustment can be performed by an AP such the AP 102 or the AP 202, by an RN such as the RNs 106 or the RN 206, by a wireless station such as the wireless stations 104 or the wireless station 204, and/or the like. In various embodiments, the adjustment or modification can be configured by an administrator or other user, dynamically determined as a result of monitoring network traffic, and/or in other ways.

Any suitable combination of various embodiments, or the features thereof, is contemplated. For example, any of the devices disclosed herein can include features of other embodiments. Thus, the AP 102 may have any of the features described herein with respect to the AP 202. Similarly, the wireless stations 104 may have any of the features described herein with respect to the wireless station 204. In like fashion, the RNs 106 may have any of the features described herein with respect to the RN 206. As another example, any blocks or steps disclosed in a process described herein may be used in other processes described herein. Thus, a block of one of the processes described in FIGS. 3-13 may be used in any of the processes described in these Figures.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A wireless station configured to transmit at a first station-transmission power level during a first time period and a second station-transmission power level during a second time period, the second station-transmission power level being a reduced station-transmission power level as compared to the first station-transmission power level, the wireless station comprising:
   a memory configured to store program code;
   a communication interface configured to exchange data with external devices; and
   a processor communicatively coupled to the memory and the communication interface, the processor configured to execute the program code to:
      determine that a wireless network provides relay service, the wireless network comprising an access point and one or more relay nodes;
      transmit, via the communication interface, a relay-service desirability indication to the access point;
      receive, via the communication interface, a relay-service confirmation from the access point; and
      transmit, via the communication interface, an uplink transmission at the second station-transmission power level responsive to the relay-service confirmation from the access point.

2. The wireless station of claim 1, wherein the processor is further configured to cause the communication interface to transmit the relay-service desirability indication at the second station-transmission power level, and
   wherein the relay-service desirability indication indicates that the wireless station requests to use the relay service.

3. The wireless station of claim 1, wherein the processor is further configured to receive a relay-service availability indication from the access point to determine whether the wireless network provides relay service, the relay-service availability indication indicating that the wireless network provides relay service.

4. The wireless station of claim 3, wherein the processor is further configured to:
   receive, via the communication interface, a beacon frame from the access point to receive the relay-service availability indication,
   transmit, via the communication interface, an association request to the access point to transmit the relay-service desirability indication, and
   receive, via the communication interface, an association response from the access point to receive the relay-service confirmation.

5. The wireless station of claim 1, wherein the processor is further configured to:
   prior to the transmitting of the relay-service desirability indication, determine whether to utilize the relay service, and
   wherein the processor causes the relay-service desirability indication to be transmitted in response to determining to utilize the relay service.

6. The wireless station of claim 1, wherein the processor transmits, via the communication interface, the uplink transmission for forwarding by at least one relay node without identifying the at least one relay node in the uplink transmission.

7. The wireless station of claim 1, wherein the second station-transmission power level is specified in a received transmission from the access point.

8. The wireless station of claim 1, wherein the processor is configured to transmit the relay-service desirability indication at the second station-transmission power level.

9. The wireless station of claim 1, wherein the processor is further configured to receive downlink transmissions from the access point via the communication interface without relay.

10. The wireless station of claim 1, wherein the processor is further configured to:
    transmit, via the communication interface, a request-to-send message for forwarding by one or more relay nodes to the access point, and
    receive, via the communication interface, a clear-to-send message from the access point without relay.

11. A method comprising, by a wireless station:
    determining that a wireless network provides relay service, the wireless network comprising an access point and one or more relay nodes;
    transmitting a relay-service desirability indication to the access point;

receiving a relay-service confirmation from the access point;

wherein the wireless station is configured to transmit at a first station-transmission power level during a first time period and a second station-transmission power level during a second time period, the second station-transmission power level being a reduced station-transmission power level as compared to the first station-transmission power level; and transmitting an uplink transmission at the second station-transmission power level responsive to the relay-service confirmation from the access point.

12. The method of claim 11, wherein:

the relay-service desirability indication is transmitted at the second station-transmission power level; and the relay-service desirability indication indicates that the wireless station requests to use the relay service.

13. The method of claim 11, wherein the determining comprises receiving a relay-service availability indication from the access point, the relay-service availability indication indicating that the wireless network provides relay service.

14. The method of claim 13, wherein:

the relay-service availability indication is received in a beacon frame from the access point;

the transmitting of the relay-service desirability indication comprises transmitting an association request to the access point, the association request comprising the relay-service desirability indication; and the receiving of the relay-service confirmation comprises receiving an association response from the access point, the association response comprising the relay-service confirmation.

15. The method of claim 11, comprising:

prior to the transmitting of the relay-service desirability indication, determining whether to utilize the relay service; and wherein the transmitting of the relay-service desirability indication is performed responsive to a determination to utilize the relay service.

16. The method of claim 11, wherein the wireless station transmits the uplink transmission for forwarding by at least one relay node without identifying the at least one relay node in the uplink transmission.

17. The method of claim 11, wherein the second station-transmission power level is specified in a received transmission from the access point.

18. The method of claim 11, wherein the relay-service desirability indication is transmitted at the second station-transmission power level.

19. The method of claim 11, comprising receiving downlink transmissions from the access point without relay.

20. The method of claim 11, comprising:

transmitting a request-to-send message for forwarding by one or more relay nodes to the access point; and receiving a clear-to-send message from the access point without relay.

* * * * *